United States Patent [19]
Runyon et al.

[11] Patent Number: 5,975,015
[45] Date of Patent: Nov. 2, 1999

[54] FEEDING APPARATUS HAVING TELESCOPING MEMBERS

[75] Inventors: Peter Mark Runyon, St. Paul; Stephen R. Alexander, Blaine; Lester Stener, Coon Rapids, all of Minn.

[73] Assignee: North States Industries, Inc., Minneapolis, Minn.

[21] Appl. No.: 09/103,025

[22] Filed: Jun. 23, 1998

[51] Int. Cl.$^6$ .................................................... A01K 39/01
[52] U.S. Cl. ........................................ 119/52.1; 119/52.2
[58] Field of Search ..................... 119/52.1, 52.2, 119/52.3, 429, 431

[56] References Cited

U.S. PATENT DOCUMENTS

| | | | |
|---|---|---|---|
| 2,216,511 | 10/1940 | Copeman | 119/52.3 |
| 2,789,534 | 4/1957 | Landgraf | 119/52.1 |
| 3,145,690 | 8/1964 | Bachman | 119/52.3 |
| 4,738,221 | 4/1988 | Nock | 119/52.2 |
| 4,747,370 | 5/1988 | Olson | 119/52.2 |
| 4,838,205 | 6/1989 | Larson | 119/52.2 |
| 5,361,723 | 11/1994 | Burleigh | 119/52.3 |

*Primary Examiner*—Michael J. Carone
*Assistant Examiner*—James S. Bergin
*Attorney, Agent, or Firm*—Merchant & Gould P.C.

[57] ABSTRACT

A feeding apparatus (device) has a housing including two members. These two members are telescoping arranged when the housing is in a disassembled position. Upon assembly of the housing, by moving these members with respect to each other, the members resiliently deform with respect to each other, and once the assembled position is reached, the peripheral surfaces of each member are in an abutment sufficient to inhibit the members, and thus, the housing, from collapsing. By making the housing in this manner, assembly is simple, and the feeding apparatus (device) is economical, as packaging volume, and resulting shipping volume, are reduced, when compared to contemporary feeding apparatus (devices).

14 Claims, 3 Drawing Sheets

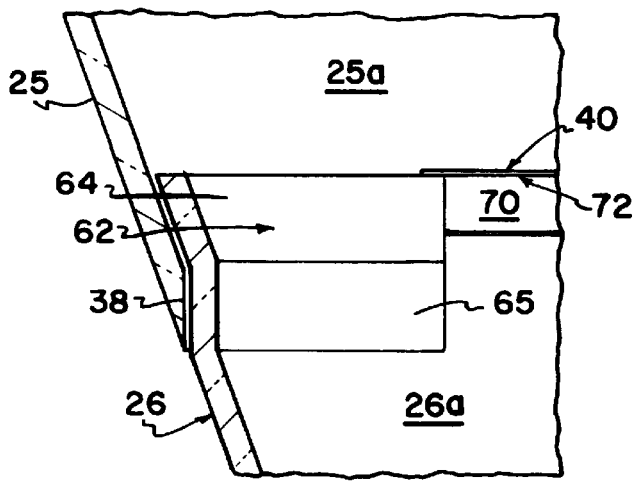
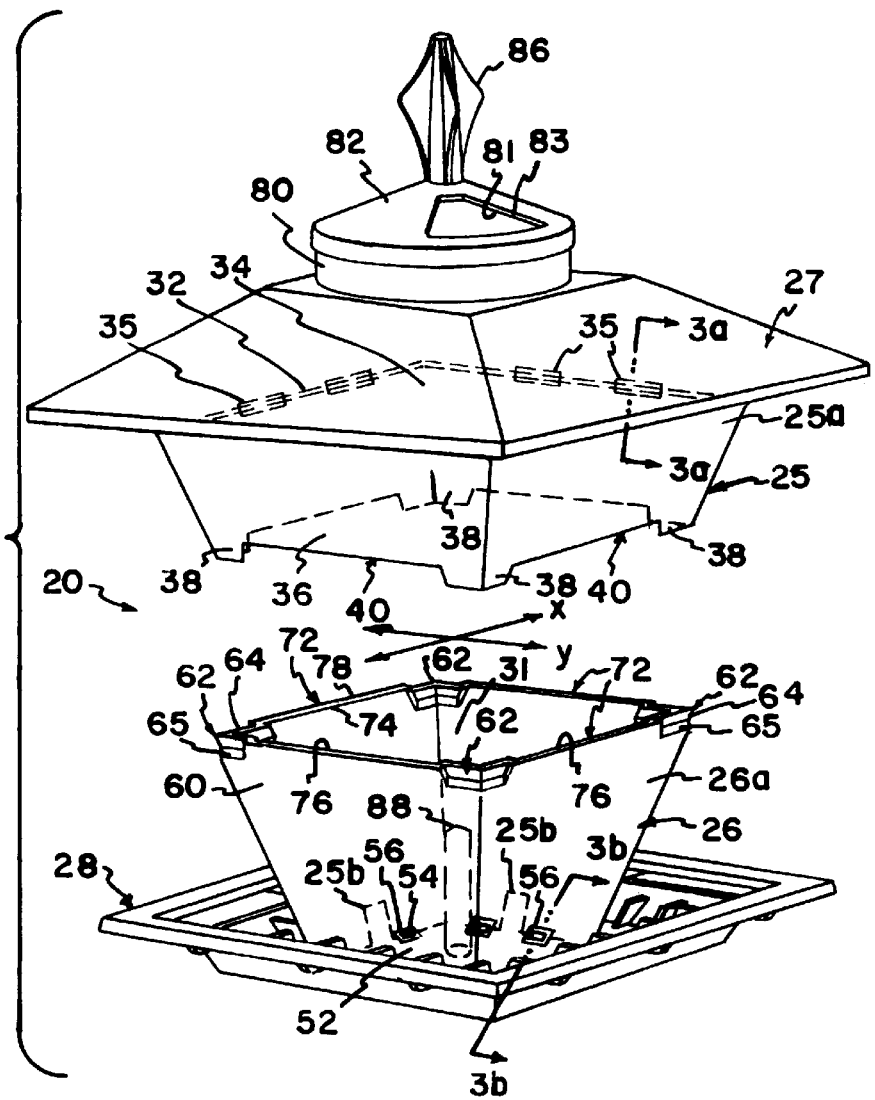

FEEDING APPARATUS HAVING TELESCOPING MEMBERS

FIELD OF THE INVENTION

The present invention relates to feeding apparatus or devices for animals such as birds and the like. In particular, the present invention relates to bird feeding devices that are economical to manufacture and ship, as they are packaged in a volume saving manner, and easy to assemble into a sturdy, self-supporting, structure that will not collapse on itself.

BACKGROUND OF THE INVENTION

Animal feeding devices, in particular bird feeders, are quite common worldwide, as many people care about the welfare of animals. It is enjoyable to watch the animals feed at these devices. Animal feeding devices are especially useful in areas where the climate makes access to food and water for animals difficult.

For example, in colder areas of North America, there is snow cover on the ground for several months. For birds living in these areas, the deep snow inhibits them in obtaining seeds, other foodstuffs, stones and/or water, necessary for maintenance. To assist birds in this winter survival, many people have bird feeding devices, that can be placed at locations above the snow cover, allowing birds access to these items. One bird feeder is disclosed in U.S. Pat. No. 4,838,205 (Larson).

Bird and animal enthusiasts are also interested in having as many feeding devices as possible, and therefore, it is always desired to produce high quality feeders at the lowest possible cost. One way to reduce costs is to reduce shipping costs. These costs can typically be reduced if more product can be shipped in the same amount of space and by using less packaging material. While fully disassembled birdfeeders occupy the least amount of volume, many people do not wish to purchase fully disassembled structures. Alternately, many fully assembled structures are also commercially available, but these structures occupy large amounts of volume in their packaging, with this increased volume leading to increased shipping costs, adding to the overall product cost.

SUMMARY OF THE INVENTION

The present invention provides an improvement in the art by providing a feeding apparatus or device, in particular a bird feeder, that can be shipped in a nearly fully assembled form at a volume smaller than its volume in actual use. It is made of quality, low cost, lightweight materials, that coupled with the smaller shipping volume reduce its overall cost to the end user (consumer). It is easily assembled into an aesthetically pleasing final form, with minimal and simple assembly steps, into a sturdy, self-supporting structure, that will not collapse upon itself.

The present invention is a feeding apparatus or device having a housing formed of at least two members, and in particular, a first member and a second member of a resiliently deformable material. The members are movable with respect to each other between a disassembled position, and an assembled position, with the second member at least partially surrounded by the first member in a telescoping arrangement, when the members are in the disassembled position. The first member has a lower portion terminating in periphery having a first edge surface running along the periphery, and the second member has an upper portion terminating in a periphery having a second edge surface running along the periphery. The upper portion of this second member is slightly greater than the lower portion of the first member in at least one dimension, such that when the first member is moved away from the second member to the assembled position, the lower portion of the first member and the upper portion of the second member deform with respect to each other.

When the assembled position is reached, the lower portion of the first member and the upper portion of the second member return to their original non-deformed states. At least a portion of the peripheries of the first and second members are in alignment, where at least a portion of the first edge surface is in abutment with at least a portion of the second edge surface. This abutment inhibits the assembled housing from collapsing.

BRIEF DESCRIPTION OF THE DRAWINGS

The present invention will be described with reference to the accompanying drawings where like reference numerals indicate corresponding or like components.

In the drawings:

FIG. 2 is an exploded view of the present invention;

FIG. 6 is a cross-sectional view of the present invention along line 6—6 of FIG. 5.

DETAILED DESCRIPTION OF THE DRAWINGS

Figure 1:
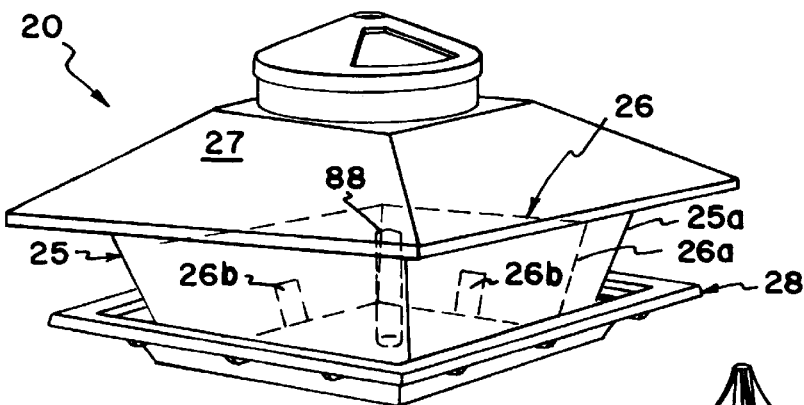
FIG. 1 is a perspective view of the present invention in a packaging or preassembled condition.
Figure 4:
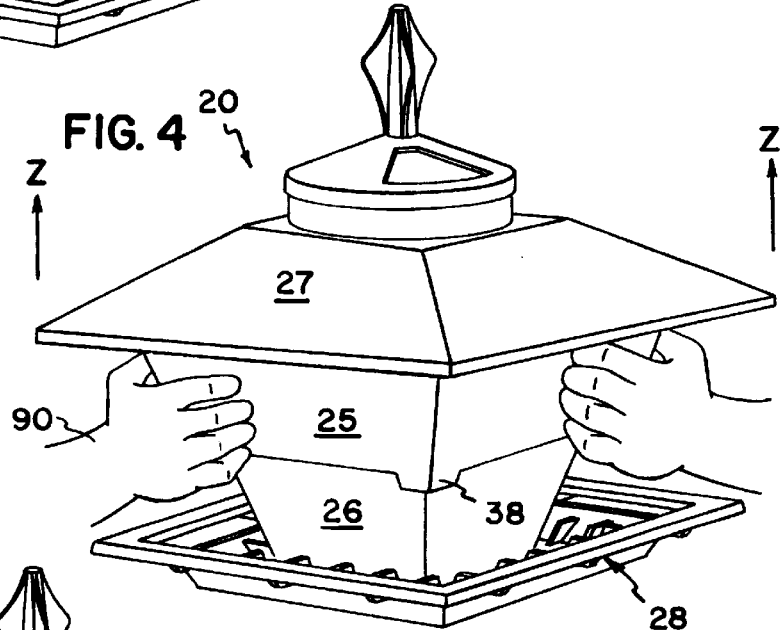
FIG. 4 is a perspective view of the present invention being assembled.

The apparatus 20 of the present invention is shown in FIG. 1 as it is packaged, in a partially assembled or disassembled arrangement, to occupy a reduced volume, and allow for lower shipping and packaging costs. The apparatus 20 in this configuration preferably includes an upper housing member 25, surrounding a lower housing member 26 (shown in broken lines), in a telescoping arrangement, that will be explained in greater detail below. Both housing members 25, 26 are shown in a preferred arrangement for packaging (in either the partially assembled or disassembled arrangements), between a cover 27 and a tray 28.

The housing members 25, 26 shown are generally formed of four upwardly diverging side walls 25a, 26a, preferably shaped in accordance with the inverted frustro-pyramid shape as disclosed in U.S. Pat. No. 4,838,205 (Larson), incorporated by reference in its entirety herein. Other shapes such as truncated conical, truncated triangular pyramid, or the like are also permitted, provided the telescoping arrangement of housing members 25, 26 is maintained. Alternately, the housing members may be of three or more pieces, provided the telescoping arrangement for each piece is maintained. The lower housing member 26 also includes an opening(s) 26b (only two shown in broken lines due to the perspective of FIGS. 1 and 2), preferably in each of the four walls 26a (at least one opening in any of the walls 26a would also be sufficient), to allow birdseed or other foodstuffs to pass from the cavity 31 (FIG. 2) of the housing 30 (FIG. 5) onto the tray 28, for access by birds or the like.

Figure 3A:
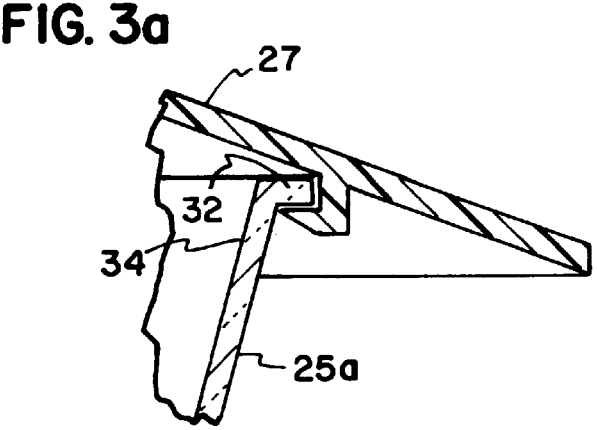
FIG. 3a is a cross sectional view taken along line 3a—3a of FIG. 2.
Figure 3B:
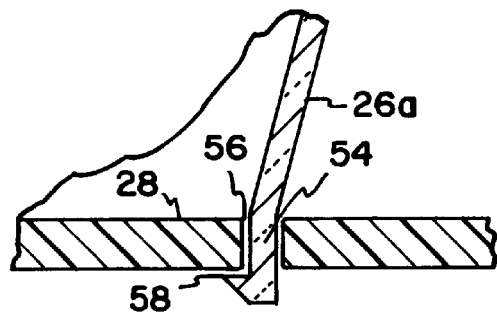
FIG. 3b is a cross sectional view taken along line 3b—3b of FIG. 2.

Turning also to FIGS. 2, 3a and 3b, the upper housing member 25 and lower housing member 26 form a housing 30 (FIG. 5) having an interior cavity 31. The upper member 25 includes a peripheral lip 32 at its upper end 34. This peripheral lip 32 is designed to be engaged with snap fitting flanges 35 (only two shown in broken lines in FIG. 2) along the inner side of the cover 27, to create a removably attachable assembly (shown in detail in FIG. 3a). It is preferred that there be two snap fitting flanges 35 per side, but more than two, or as few as one per side is also permissible. Also, there need only be snap fitting flange(s) on as few as two opposite sides, if desired. Alternately, the upper housing member 25 could attach to the cover 27 by other well known attachments, including adhesives, welds or the like.

Figure 7:
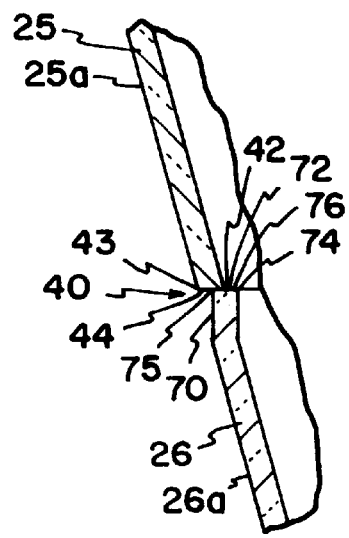
FIG. 7 is a cross-sectional view of the present invention along line 7—7 of FIG. 5.

With continued reference to FIG. 2, the lower end 36 of the upper housing member 25 includes beveled flanges 38 at the corners, protruding from a peripheral edge 40. This peripheral edge 40 includes an inner edge 42 and an outer edge 43, with a substantially flat edge surface 44 therebetween (FIG. 7).

The lower housing member 26 has a lower end 52 with snap fitting flanges 54 extending therefrom. These snap fitting flanges 54 engage correspondingly positioned openings 56 in the tray 28, and extend through the openings 56, such that their platforms 58 engage the lower surface of the tray 28, creating a removably attachable assembly (shown in detail in FIG. 3b). It is preferred that there be two snap fitting flanges 54 per wall 26a, but more than two, or as few as one per wall is also permissible, with a corresponding number of openings 56 in the tray 28. Also, there need only be snap fitting flange(s) on as few as two opposite sides, if desired. Alternately, the lower housing member 26 could attach to the tray 28 by other well known attachments, including adhesives, welds or the like.

It is preferred that for packaging purposes, the upper housing member 25 be attached to the cover 27 and the lower housing member 26 be attached to the tray 28 to be in a position defined as partially assembled. In this manner, only the housing cover members 25, 26 need to be joined upon assembly. Alternately, all of these components can be placed together in a disassembled arrangement with the user providing all of the assembly.

With continued reference to FIG. 2, the upper end 60 of the lower housing member 26 includes detents 62 at the corners, formed of outwardly angled slats 64, 65, defining a shoulder. Turning also to FIGS. 6 and 7, ridges 70 extend along each side of the member 26 between the respective detents 62, and are outside of the detents 62. The ridges 70 terminate in peripheral edges 72, each peripheral edge 72 formed by an inner edge 74 and an outer edge 75, with a substantially flat edge surface 76 therebetween.

The lower housing member 26 is formed such that the distances (lengths, with respect to the rectangular peripheries of the housing members 25, 26 shown) in longitudinal dimension (indicated by the arrow "x") and the transverse dimension (indicated by the arrow "y"), between the outer edges 75 of the lower housing member 26, are greater than the corresponding distances between the inner edges 42 of the upper housing member 25. This allows for the housing members 25, 26 to be snapped together forming a stable structure (that will not collapse on itself) upon assembly (detailed below), where the beveled flanges 38 of the upper member 25 rest in the respective detents 62 of the lower housing member 26 (FIG. 6) and the edge surfaces 44, 76 of the upper 25 and lower 26 members are in abutment (FIG. 7). This difference in distances need only be slight, but great enough to allow for sufficient abutment of the edge surfaces 44, 76 sufficient to prevent collapse of the housing members 25, 26 (detailed below).

At least one housing member is of a resiliently deformable material such as polystyrene or other synthetic polymeric or plastic material, although it is preferred that both housing members be made of the aforementioned resiliently deformable material(s). It is preferred that these materials be transparent (clear to the viewing eye in normal light), for aesthetics, but translucent and opaque materials are also permissible. These housing members 25, 26 may be formed by conventional materials forming techniques including injection molding, blow molding, extrusion or the like, as unitary structures. These material forming techniques may also be used to form pieces (such as the sidewalls 25a, 26a detailed above) that can be attached together, by adhesives, welds or the like, to form the respective housing members 25, 26.

The cover 27 includes an upper portion 80 with an opening 81 therein. A rotatable member 82 with opening 83 therein is rotatably attached to the upper portion 80 by a peg-type friction fitting structure (not shown) that fits an opening (not shown) in the upper portion 80, or other similar mechanism that permits rotation. The openings 81, 83 of the respective upper portion 80 and rotatable member 82 are preferably similarly dimensioned, whereby the rotatable member 82 can be rotated to a position (also known as an open position) such that its opening 83 coincides with the opening 81 of the upper portion 80, allowing for the cavity 31 (FIG. 2) of the housing 30 (FIG. 5) to be accessed, such as when the apparatus 20 is being filled with birdseed or other foodstuffs. The upper portion 80 and rotatable member 82 may also include structure or cooperating structures that limit the rotational travel of the rotatable member 82 and/or allow for temporary retention of the rotatable member 82 such that the rotatable member 82 is in a closed position with respect to the upper portion 80.

A cornice (or finial) 86 may be attached to the rotatable member 82, preferably by a friction fit (male/female) attachment on the cornice (or finial) 86 and rotatable member 82. This cornice (or finial) 86, may be twisted for manually controlling the positioning of the rotatable member 82 and its opening 83 with respect to that of the opening 81 of the upper portion 80.

The tray 28 may be of any well known configuration, but is preferably in accordance with scatter restricting feeding tray disclosed in U.S. Pat. No. 4,838,205 (Larson). The tray 28 may also include an upwardly extending hollow tube 88 for receiving a pole, or the like, for above-ground mounting of the apparatus 20.

The cover 27, tray 28, rotatable member 82 and cornice 86 are also preferably made of polymeric materials that are preferably resilient, such as polypropylene, polyethylene, copolymers or mixtures thereof, by conventional polymer working techniques such as injection molding or the like. They are also preferably one piece. The cover 27, tray 38, rotatable member 82 and cornice 86 may be opaque, translucent or transparent, with their shapes in accordance with the shape of the respective housing member they are designed to attach thereto.

In FIGS. 4–7, the mode of operation, or assembly, from the partially assembled or disassembled position (FIG. 1), is detailed. Preferably, for packaging purposes, the upper housing member 25 is attached to the cover 27 and the lower housing member 26 is pre-assembled to the tray 28, as detailed above. In the packaged arrangement, the upper housing member 25 is telescopically collapsed relative to the lower housing member 26. For final assembly, after removal from the package, the user 90 grasps the upper housing member 25, and moves it upward in the direction of the arrows "z". This upward movement is such that the inner walls of the upper member 25 come into abutment with the with the ridges 70, in particular the outer edges 75 of the lower member 26, causing slight deformations of the upper member 25 and the lower member 26. Upward movement continues until the peripheral edges 40 of the upper member 25 clear the peripheral edges 72 of the lower member 26. This clearance is slight, to allow the beveled flanges 38 of the upper member 25 to engage the respective detents 62 of the lower member 26.

Once this slight clearance is achieved, both members 25, 26, are no longer deformed, and relax to their initial shapes and dimensions. This relaxation allows for the engagement of beveled flange 38 to respective detent 62 and forces the upper housing member 25 downward (in the direction opposite arrows "z"). The beveled flanges 38 move into alignment with the slats 64, 65, and the movement of the members 25, 26 toward each other ceases as the edge surfaces 44, 76 on the upper and lower housing members 25, 26 abut, such that the apparatus 20 is now at rest and structurally stable.

Figure 5:
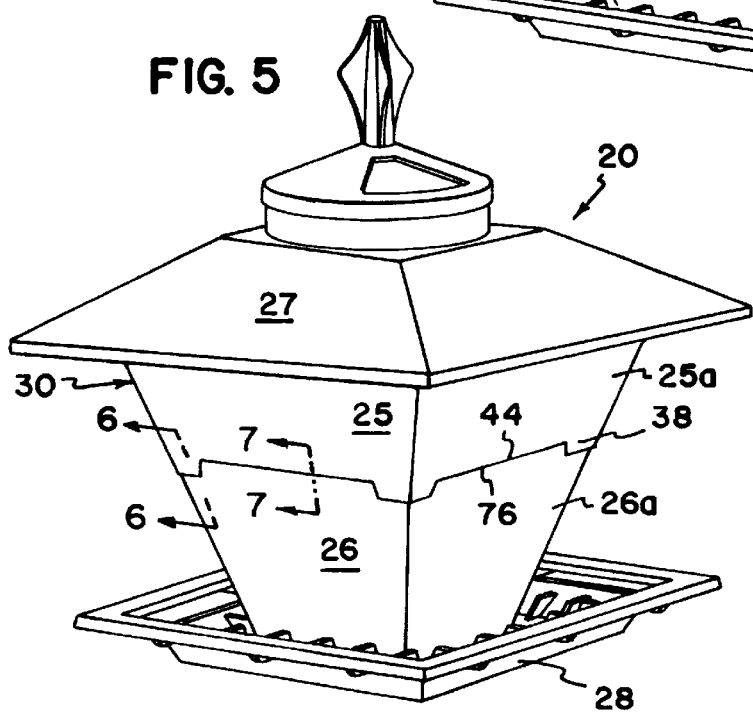
FIG. 5 is a perspective view of the present invention as assembled.

FIGS. 5–7 specifically detail this at rest position, as the apparatus 20 is now fully assembled, and the housing 30, with a cavity 31 (FIG. 2) for accommodating food (e.g., birdseed), has been formed. In this assembled position, the beveled flanges 38 are aligned with the slats 64, 65 in the detents 62 (FIG. 6), and the edge surfaces 44, 76 on the upper and lower housing members 25, 26 abut (FIG. 7). This abutment, prevents any collapse of the housing members 25, 26 (in the direction opposite arrows "z").

The above specification provides a complete description of the manufacture and use of the invention. Since many embodiments of the invention can be made without departing from the spirit and scope of the invention, the invention resides in the claims hereinafter appended.

What is claimed is:

1. A feeding apparatus comprising:
 a housing, said housing comprising:
  at least a first member and a second member of a resiliently deformable material movable with respect to each other between a disassembled position and an assembled position, said second member at least partially surrounded by said first member in a telescoping arrangement, when said members are in said disassembled position;
  said first member having a lower portion terminating in a periphery having a first edge surface running along said periphery;
  said second member having an upper portion terminating in a periphery having a second edge surface running along said periphery; and
  said upper portion of said second member being slightly greater than said lower portion of said first member in at least one dimension, such that when said first member is moved away from said second member to said assembled position, said lower portion of said first member and said upper portion of said second member deform with respect to each other, and when said assembled position is reached, said lower portion of said first member and said upper portion of said second member return to their original non-deformed states, and at least a portion of said peripheries of said first and second members are in alignment, such that at least a portion of said first edge surface is in abutment with at least a portion of said second edge surface, said abutment inhibiting the housing from collapsing; and at least one feed opening disposed in said housing.

2. The feeding apparatus of claim 1, wherein said second member includes a lower portion, and additionally comprising a tray configured for attachment to said lower portion.

3. The feeding apparatus of claim 2, wherein said tray includes a portion adapted to receive a pole or elevating member.

4. The feeding apparatus of claim 1, wherein said first member includes an upper portion, and additionally comprising a cover configured for attachment to said upper portion.

5. The feeding apparatus of claim 1, wherein said at least one dimension includes two dimensions, defined as the longitudinal and transverse dimensions respectively, whereby substantially all of the peripheries of said first member and said second member are in alignment, such that at least a portion of said first edge surface is in abutment with at least a portion of said second edge surface, said abutment inhibiting the housing from collapsing.

6. The feeding apparatus of claim 5, wherein said lower portion of said first member and said upper portion of said second member are rectangular in shape.

7. The feeding apparatus of claim 6, wherein said lower portion of said first member includes a plurality of flanges, extending beyond said edge surfaces, and
 said upper portion of said second member includes a plurality of detents, corresponding to said flanges, said detents configured to engage said corresponding flange.

8. The feeding apparatus of claim 1, wherein said resiliently deformable material includes polystyrene.

9. A feeding apparatus comprising:
 a housing, said housing comprising:
  at least a first member and a second member of a resiliently deformable material movable with respect to each other between a disassembled position and an assembled position, said second member at least partially surrounded by said first member in a telescoping arrangement, when said members are in said disassembled position;
  said first member having a lower portion terminating in periphery having a first edge surface running along said periphery;
  said second member having an upper portion terminating in a periphery having a second edge surface running along said periphery;
  said upper portion of said second member being slightly greater than said lower portion of said first member in at least one dimension, such that when said first member is moved away from said second member to said assembled position, said lower portion of said first member and said upper portion of said second member deform with respect to each other, and when said assembled position is reached, said lower portion of said first member and said upper portion of said second member return to their original non-deformed states, and at least a portion of said peripheries of said first and second members are in alignment, such that at least a portion of said first edge surface is in abutment with at least a portion of said second edge surface, said abutment inhibiting the housing from collapsing;

a cover configured for attachment to said first member; and a tray configured for attachment to said second member.

10. The feeding apparatus of claim 9, wherein said at least one dimension includes two dimensions, defined as the longitudinal and transverse dimensions respectively, whereby substantially all of the peripheries of said first member and said second member are in alignment, such that at least a portion of said first edge surface is in abutment with at least a portion of said second edge surface, said abutment inhibiting the housing from collapsing.

11. The feeding apparatus of claim 10, wherein said lower portion of said first member and said upper portion of said second member are rectangular in shape.

12. The feeding apparatus of claim 9, wherein said tray includes a portion adapted to receive a pole or elevating member.

13. The feeding apparatus of claim 9, wherein said lower portion of said first member includes a plurality of flanges, extending beyond said edge surfaces, and said upper portion of said second member includes a plurality of detents, corresponding to said flanges, said detents configured to engage said corresponding flange.

14. The feeding apparatus of claim 9, wherein said resiliently deformable material includes polystyrene.

* * * * *